United States Patent
Osterländer et al.

(10) Patent No.: US 7,536,929 B2
(45) Date of Patent: May 26, 2009

(54) BALL SCREW AND METHOD FOR PRODUCING A SPINDLE NUT, IN PARTICULAR OF A BALL SCREW

(75) Inventors: Jürgen Osterländer, Emskirchen (DE); Rudolf Bauer, Herzogenaurach (DE); Torsten Keller, Hessdorf (DE)

(73) Assignee: INA-Schaeffler, KG (DE)

( * ) Notice: Subject to any disclaimer, the term of this patent is extended or adjusted under 35 U.S.C. 154(b) by 704 days.

(21) Appl. No.: 10/528,271

(22) PCT Filed: Aug. 28, 2003

(86) PCT No.: PCT/EP03/09508
§ 371 (c)(1),
(2), (4) Date: Apr. 25, 2005

(87) PCT Pub. No.: WO2004/027286
PCT Pub. Date: Apr. 1, 2004

(65) Prior Publication Data
US 2005/0257636 A1    Nov. 24, 2005

(30) Foreign Application Priority Data
Sep. 17, 2002 (DE) .................. 102 43 020

(51) Int. Cl.
*F16H 25/20* (2006.01)
(52) U.S. Cl. .............. 74/424.87; 74/424.82; 74/424.86
(58) Field of Classification Search . 74/424.81–424.84, 74/424.86, 424.87; 29/893.33
See application file for complete search history.

(56) References Cited

U.S. PATENT DOCUMENTS

| 4,274,297 A | 6/1981 | Blurock et al. |
| 6,116,109 A | 9/2000 | Zernickel |
| 7,080,571 B2 * | 7/2006 | Watanabe et al. ........ 74/424.86 |
| 2002/0026844 A1 | 3/2002 | Fujita |

FOREIGN PATENT DOCUMENTS

| DE | 4131486 | 3/1993 |
| DE | 4225836 | 2/1994 |
| DE | 19944875 | 3/2001 |
| DE | 10062982 | 6/2002 |
| EP | 0103316 | 3/1984 |
| EP | 0985470 | 3/2000 |
| FR | 2204271 | * 5/1974 |

OTHER PUBLICATIONS

German Search Report for 10243020.9 dated Sep. 17, 2002.
International Search Report for PCT/EP03/09508 dated Apr. 13, 2004.

* cited by examiner

*Primary Examiner*—William C Joyce
(74) *Attorney, Agent, or Firm*—Ostrolenk, Faber, Gerb & Soffen, LLP

(57) ABSTRACT

Method for producing a spindle nut of a ball screw, by provided the circumference of the nut with at least one through-opening for receiving a deflecting piece for balls of the ball screw. A hole punch arranged in the spindle nut and operable to punch out the through-opening from radially inward to radially outward through the casing of the spindle nut.

2 Claims, 1 Drawing Sheet

BALL SCREW AND METHOD FOR PRODUCING A SPINDLE NUT, IN PARTICULAR OF A BALL SCREW

CROSS REFERENCE TO RELATED APPLICATION

The present application is a 35 U.S.C. §§371 national phase conversion of PCT/EP2003/009508 filed 28 Aug. 2003, which claims priority of German Application No. 102 43 020.9 filed 17 Sep. 2002. The PCT International Application was published in the German language.

The present invention relates to a method for producing a spindle nut of a ball screw and to a ball screw.

BACKGROUND OF THE INVENTION

DE 199 44 875 A1, for example, discloses a ball screw with a spindle and a nut surrounding the spindle. Balls arranged between the spindle and the nut are arranged in such a way that the balls can roll in a thread groove formed on the outer surface of the spindle and in a corresponding thread groove formed on the inner surface of the nut. Radial through-openings are also provided on the nuts. Deflecting pieces are fitted in those openings for the return of the balls respectively from a run-out end of a common turn of the thread grooves to a run-in end of this turn.

The nut is configured as a one-piece sleeve with a circular-cylindrical casing. Each fitted deflecting piece is arranged in the associated through-opening of the nut and completely within the outer casing. The through-openings are usually produced by machining. In this process, burr may be produced at the rim of the through-opening, which is not only obtrusive but also may impair the satisfactory function of the ball screw. In particular, where the rim of the through-opening goes over into the thread groove of the spindle nut, burr can lead to considerable problems. When the deflecting piece is fitted in the through-opening and the rolling ball rolls out of the thread groove of the spindle nut and into the deflecting channel of the deflecting piece, or is pressed in by following balls, the ball may cant at the burr and block the circulation of the balls.

SUMMARY OF THE INVENTION

The object of the present invention is to provide a method for producing a spindle nut with which the disadvantage of the prior art is avoided.

According to the invention, this object is achieved by a hole punch which is arranged within the spindle nut operative for punching out the through-opening from radially inward to radially outward through the casing of the spindle nut. The outward punching from inward to outward offers decisive advantages. On the one hand, the effect of a punching draw-in that occurs in punching operations is utilized. This punching draw-in occurs on the workpiece on its surface facing the hole punch. On the finished workpiece, this punching draw-in is manifested as a slight rounding at the punched opening. In the method according to the invention, the punching draw-in is used in a particularly favorable way, in that it is formed on the radially inner rim of the through-opening. This means that, in particular, the rim at the transition from the through-opening to the thread groove of the spindle nut takes the form of a slight convex rounding. This in turn ensures that no undesired burr can form in the region of the circulation of the balls, particularly in the transition from the through-opening to the thread groove.

A further advantage of the method according to the invention is that the cut portion of the punching operation is formed radially on the inside of the wall of the through-opening. The cut portion, which is formed with high precision on the workpiece, permits exact dimensioning of the through-opening to be punched out. This means that the deflecting piece can be satisfactorily positioned in the through-opening, and to be precise, can be fitted radially on the inside. The torn-out portion of the punching operation is formed radially on the outside of the outer side of the spindle nut during punching, and that portion takes the form of a slightly conical widening. This effect can also be advantageously utilized for the purpose of allowing the deflecting piece to be fitted without problem into the through-opening from radially outside on account of the conical widening.

The punching tool preferably comprises not only the hole punch but also includes a threaded spike having a thread profile which is formed as a negative profile in relation to an inner thread of the spindle nut forming a thread groove for balls. The hole punch is arranged radially displaceably in the threaded spike, and the spindle nut is arranged on the threaded spike, whereby the hole punch is moved radially outward out of the threaded spike. Because the spindle nut is arranged on the threaded spike before the punching-out operation allows exact positioning of the hole punch with respect to the spindle nut. This means that, even if a number of hole punches provided in the threaded spike are used, through-openings are punched at exactly the intended locations after the positioning of the spindle nut on the threaded spike.

In a ball screw according to the invention, the rim of the through-opening lying on the inner circumference of the spindle nut has a convex rounding. As described in detail at the beginning, this convex rounding is the result of a punching operation from radially inward to radially outward, and the punching draw-in causes this rounding according to the invention. However, other methods by which this convex rounding is achieved may also be provided. According to the invention, in any event the convex rounding ensures that no undesired burr can be formed in the transitional region of the thread groove of the spindle nut and the through-opening.

BRIEF DESCRIPTION OF THE DRAWINGS

The invention is explained in more detail below on the basis of an exemplary embodiment that is represented in five figures, in which.

BRIEF DESCRIPTION OF A PREFERRED EMBODIMENT

Figure 5:
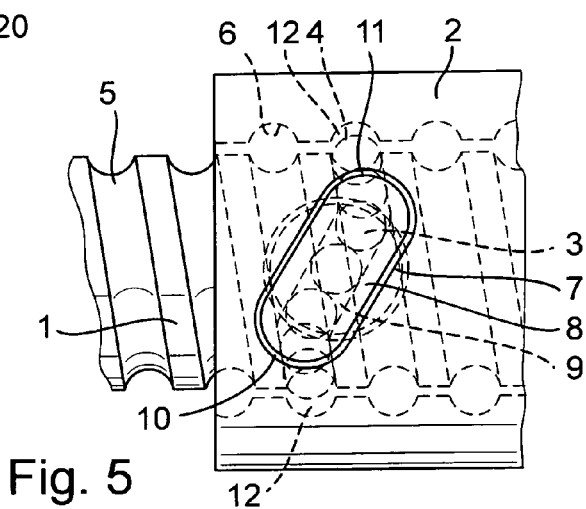

A ball screw according to the invention is depicted in FIG. 5. It comprises a spindle nut 2 arranged on a spindle 1 and balls 3, which are represented here by dashed lines. The balls 3 can roll along a thread path 4. The thread path 4 comprises a first thread groove 5 formed on the spindle 1 and a second thread groove 6 formed in the spindle nut 2. The spindle nut 2 is provided with a number of receptacles 7, arranged distributed over its circumference, for receiving deflecting pieces 8. Each deflecting piece 8 comprises a deflecting channel 9 for return travel of the balls 3 respectively from a run-out end 10 to a run-in end 11 of at least one common turn 12 of the thread path 4.

Figure 1:
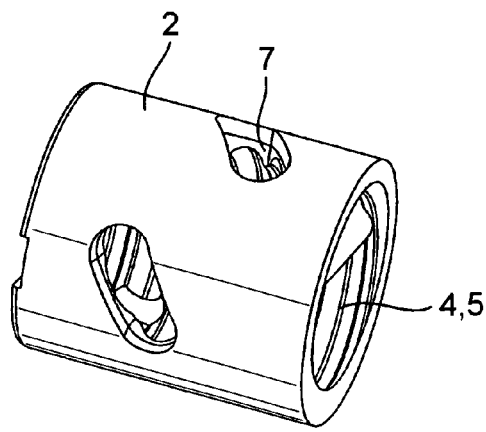
FIG. 1 shows a perspective representation of a spindle nut according to the invention.

FIG. 1 shows a spindle nut 2 according to the invention as a single part, with through-openings 7 punched out from radially inward to radially outward.

Figure 2:
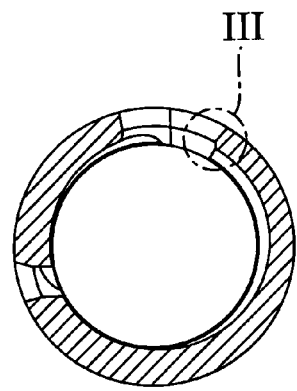
FIG. 2 shows a cross section through the spindle nut according to the invention from FIG. 1.

The sectioned through-opening 7 can also be seen in FIG. 2.

Figure 3:
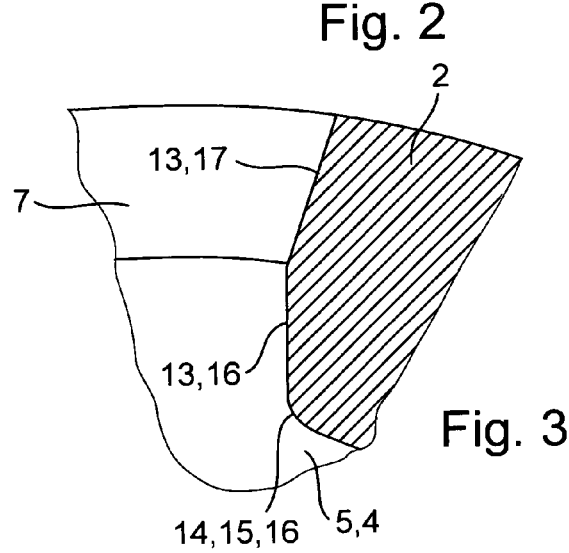
FIG. 3 shows an enlargement of a detail of the spindle nut according to the invention from FIG. 2.

FIG. 3 then shows an enlarged representation of a wall 13 of the through-opening 7. The rim 14 of the through-opening 7 lying on the inner circumference of the spindle nut 2 has a convex rounding 15 at the transition to the thread path 4, and in particular to the thread groove 5 of the spindle nut 2. The part 16 of the wall 13 adjoining the rim 14 is formed in a cylindrical manner or in the form of a slot with mutually parallel wall portions. The adjoining part 17 of the wall 13 is slightly conically widened.

Figure 4:
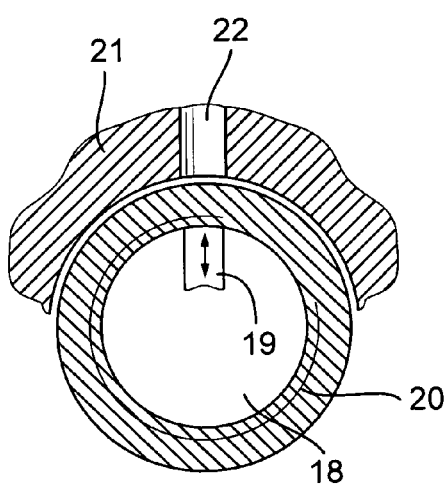
FIG. 4 shows a method for producing the spindle nut according to the invention from FIGS. 1 to 3 and FIG. 5 shows a ball screw according to the invention in a simplified representation.

FIG. 4 shows a method for producing the spindle nut 2 according to the invention, in particular the production of the through-opening 7, which opening is represented greatly enlarged in FIG. 3.

According to FIG. 4, a punching tool is provided, comprising a threaded spike 18 and one or more hole punches 19 arranged in the threaded spike 18. The threaded spike 18 has a thread profile 20, which is formed as a negative profile in relation to the thread groove 5 of the spindle nut 2. The hole punch 19 is arranged radially displaceably in the threaded spike 18. Furthermore, the punching tool comprises a female die 21, which is provided with an opening 22 for receiving punched-out material of the spindle nut 2 and the hole punch 19.

To produce the through-opening 7, the hole punch or punches 19 are displaced radially outward, and material is punched out from the spindle nut 2. The punching draw-in that usually occurs on the workpiece in punching operations takes the form here, according to the invention, of the convex rounding 15 described further above on the inner rim 14 of the through-opening 7. Likewise as a consequence of the punching operation from radially inward to radially outward, the cut portion adjoins the radially inner rim, which has already been referred to further above as the part 16 of the wall 13. Adjoining this, the torn-out portion can be seen likewise formed as a consequence of the punching operation and already referred to further above as the conical part 17 of the wall 13.

The convex rounding 15 has the advantage that no undesired burr is formed on the thread path 4 or the thread groove 5 of the spindle nut 2 at the transition to the through-opening 7. The part 16 of the wall 13 is in the present case the cut portion of the punching operation. This cut portion can be produced with high precision, so that the deflecting piece 8 can be fitted exactly into the through-opening 7. The conical widening of the through-opening 7 as a consequence of the conical part 17 of the wall 13 makes it possible for the deflecting piece 8 to be fitted unproblematically from radially the outside.

The invention claimed is:

1. A ball screw with a thread path for accommodating rolling balls, the ball screw comprising:
   a spindle including a first thread groove;
   a spindle nut positioned on the spindle, the spindle nut having a second thread groove, a through-opening and an inner circumference; and
   the thread path formed by the first thread groove on the spindle and by the second thread groove in the spindle nut, the thread path including at least one common turn with a run-out end and a run-in end;
   at least one deflecting piece positioned in the through-opening of the spindle nut;
   the deflecting piece including a deflecting channel positioned and configured to return the rolling balls from the run-out end to the run-in end of the at least one common turn of the thread path,
   wherein the through-opening includes a rim positioned on the inner circumference of the spindle nut, the rim having a convex rounding comprising material of the spindle nut drawn from radially inside to radially outside the spindle nut.

2. The ball screw as claimed in claim 1, wherein the convex rounding is an edge formed at a transition from the through-opening to the thread groove of the spindle nut.

* * * * *